US011482880B1

(12) United States Patent
Ulrich (10) Patent No.: US 11,482,880 B1
(45) Date of Patent: Oct. 25, 2022

(54) SUPPLEMENTAL EMERGENCY POWER SOURCE FOR RAILROAD TRACK SWITCH SYSTEMS

(71) Applicant: RedHawk Energy Systems, LLC, Pataskala, OH (US)

(72) Inventor: Thomas J Ulrich, Pataskala, OH (US)

(73) Assignee: RedHawk Energy Systems, LLC, Pataskala, OH (US)

( * ) Notice: Subject to any disclaimer, the term of this patent is extended or adjusted under 35 U.S.C. 154(b) by 6 days.

(21) Appl. No.: 17/333,814

(22) Filed: May 28, 2021

(51) Int. Cl.
| | |
|---|---|
| H02J 9/06 | (2006.01) |
| B61L 5/06 | (2006.01) |
| H02J 7/00 | (2006.01) |
| H02J 4/00 | (2006.01) |
| H02J 7/34 | (2006.01) |
| H02J 1/10 | (2006.01) |

(52) U.S. Cl.
CPC .......... *H02J 9/06* (2013.01); *B61L 5/06* (2013.01); *B61L 5/062* (2013.01); *H02J 1/108* (2013.01); *H02J 4/00* (2013.01); *H02J 7/0042* (2013.01); *H02J 7/345* (2013.01); *H02J 9/061* (2013.01)

(58) Field of Classification Search
CPC .. B61L 5/06; B61L 5/062; B61L 5/067; H02J 7/345; H02J 9/061; H02J 9/06; H02J 4/00; H02J 1/06; H02J 1/00; H02J 1/108; G06F 1/30
See application file for complete search history.

(56) References Cited

U.S. PATENT DOCUMENTS

| | | | | |
|---|---|---|---|---|
| 2015/0035360 A1* | 2/2015 | Marbach | ................... | H02J 3/28 307/23 |
| 2017/0183021 A1* | 6/2017 | Johnson | ................... | B61L 5/06 |

* cited by examiner

*Primary Examiner* — Ryan Johnson
(74) *Attorney, Agent, or Firm* — Frank H. Foster; Kremblas & Foster (57) ABSTRACT

A supplemental power source connectable to a standard railroad track switch power source. A pair of electrical connectors (A) form a supplemental power source circuit input. Another pair of electrical connectors (B) form a supplemental power source output and are configured for connection to a standard railroad track switch. An electrical conductor connects a first one of the supplemental power source output connectors (B) to a first one of the supplemental power source input connectors (A). A diode is connected between a second one of the supplemental power source input connectors (A) and a second one of the supplemental power source output connectors (B). The diode is connected to prevent current flow to the standard railroad track switch power source. An ultracapacitor is electrically connected between the electrical conductor and the second one of the supplemental power source output connectors (B).

10 Claims, 5 Drawing Sheets

SUPPLEMENTAL EMERGENCY POWER SOURCE FOR RAILROAD TRACK SWITCH SYSTEMS

BACKGROUND OF THE INVENTION

This invention is a supplemental electrical power source for improving the reliability of a standard electrical power source that is commonly used for operating a railroad track switch system. The supplemental power source stores a supplemental supply of electrical energy that is capable of normal and emergency operation of the railroad track switch to lessen the power demand on the existing system and allow operation in the event of a failure of a component of a standard electrical power source that is installed as known in the prior art. The supplemental power source is configured to facilitate easy connection to a previously installed, standard railroad track switch and to allow multiple options for its initial connection with or without some components and also later addition of additional components that were not initially installed. Safety features protect workers during installation and maintenance.

Figure 1:
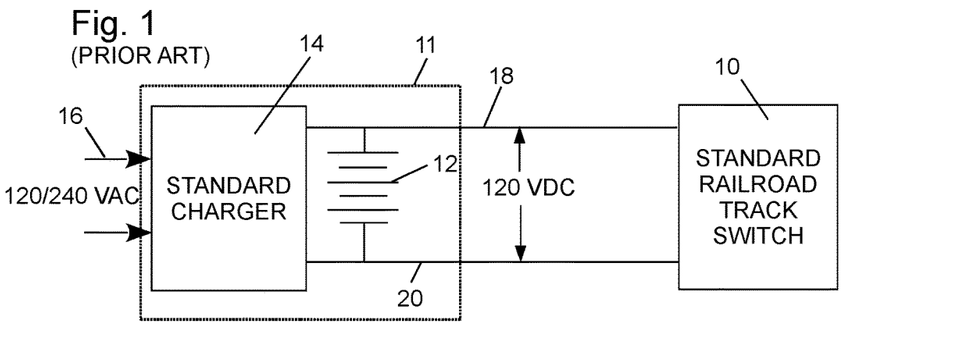
FIG. 1 is a block diagram illustrating a prior art railroad switch system.

FIG. 1 illustrates a standard railroad track switch system for switching a railroad track. The term "standard" is an adjective that is used in this description and accompanying drawings to designate a prior art railroad switch system or a prior art component of a standard railroad switch power source of the type that have been previously installed in many places throughout the railway network. A railroad track switch 10 is an electric powered, electromechanical device that guides railway trains from one track to another track. Electrical power is typically supplied to the track switch 10 from a standard power source 11 that includes a standard battery 12 and a standard battery charger 14. The track switch 10 includes an electric motor that switches a mechanical track switch or that drives a hydraulic pump for a hydraulic track switch. Because a railroad track switch includes an electric motor that is stationary at the instant that it is initially actuated by application of voltage, it requires a high initial inrush current. Consequently, a railroad track switch requires a source of power that is capable of delivering a high initial current. For that reason a storage battery has been used as the most cost effective way of powering a railroad track switch. The standard battery 12 may be a gang of multiple batteries or battery cells which are connected in series and have a voltage of, for example, 120 volts DC. Electrical power from the battery 12 actuates the electromechanical components of the track switch 10 when signaled by its control circuit (not illustrated). The charge on the battery 12 is maintained by the standard charger 14 which receives its power from an input 16 connected to the public power grid that usually supplies a standard voltage of 120 VAC or 240 VAC, for example.

Although standard railroad switch installations have been reasonably reliable, there have been problems that temporarily prevent their operation and consequently cause a shutdown of train passage until the problem is repaired. For example, sometimes one or more battery cells become defective and may even form a short or open circuit resulting in excessive current and internal overheating or no current. The cell failure prevents full recharge and reduces battery voltage so that the standard battery 12 can no longer actuate the railroad switch 10. The cell failure may also cause excessive charger current which can damage the charger or cause it to be disconnected by an overcurrent protection circuit or fuse. As another example, the standard charger can itself become defective and cease charging the battery 12. In that event, the battery 12 becomes discharged from continued operation and eventually becomes unable to operate the railroad switch 10. Additionally, the public power grid sometimes experiences a service interruption which, if it continues for a sufficient time, allows the battery 12 to eventually discharge enough to prevent operation of the railroad switch 10.

The existing network of railroad tracks includes a very large number of operating standard railroad track switches that represent a substantial investment in money, time and labor. Replacing them is impractical and would require another substantial investment in money, time and labor. Consequently, it is a purpose and feature of the invention to provide a cost effective way to overcome the described problems and make the railroad track switch power source 11 more reliable by means of an add-on, supplemental apparatus that can be retrofit to existing standard railroad track switch power sources of the type illustrated in FIG. 1. Another purpose and feature of the invention is to provide a supplemental apparatus that not only incorporates electrical circuitry and components that solve the described problems but also provides structural features that facilitate the connection of the supplemental equipment to existing railroad switches in a manner that minimizes the time, labor and cost required to accomplish the retrofit. Additional purposes and features of the invention are: (1) to provide a supplemental apparatus that requires only minimum custom wiring and minimum modification of a previously installed standard railroad track switch power source to which it is connected; (2) to provide such a supplemental apparatus that has flexibility to allow the inclusion or exclusion of optional circuit components without requiring custom rewiring; (3) to provide integrated personal safety and circuit protection features; and (4) to provide circuit features that can alternatively be integrated as a part of an OEM power system for a railroad switch.

BRIEF SUMMARY OF THE INVENTION

The invention is a supplemental power source that is connectable to a standard railroad track switch power source. A pair of electrical connectors (A) form the supplemental power source input from the standard railroad track switch power source. Another pair of electrical connectors (B) form a supplemental power source output and are configured for connection to a standard railroad track switch. An electrical conductor is electrically connected between a first one of the supplemental power source output connectors (B) and a first one of the supplemental power source input connectors (A). A diode is connected between a second one of the supplemental power source input connectors (A) and a second one of the supplemental power source output connectors (B). The diode is connected in a polarity to prevent current flow to the standard battery and the standard battery charger of a previously installed standard railroad track switch power source. An ultracapacitor is electrically connected between the electrical conductor and the second one of the supplemental power source output connectors (B).

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other circuit elements where such connection is recognized as being equivalent by those skilled in the art.

DETAILED DESCRIPTION OF THE INVENTION

Figure 2:
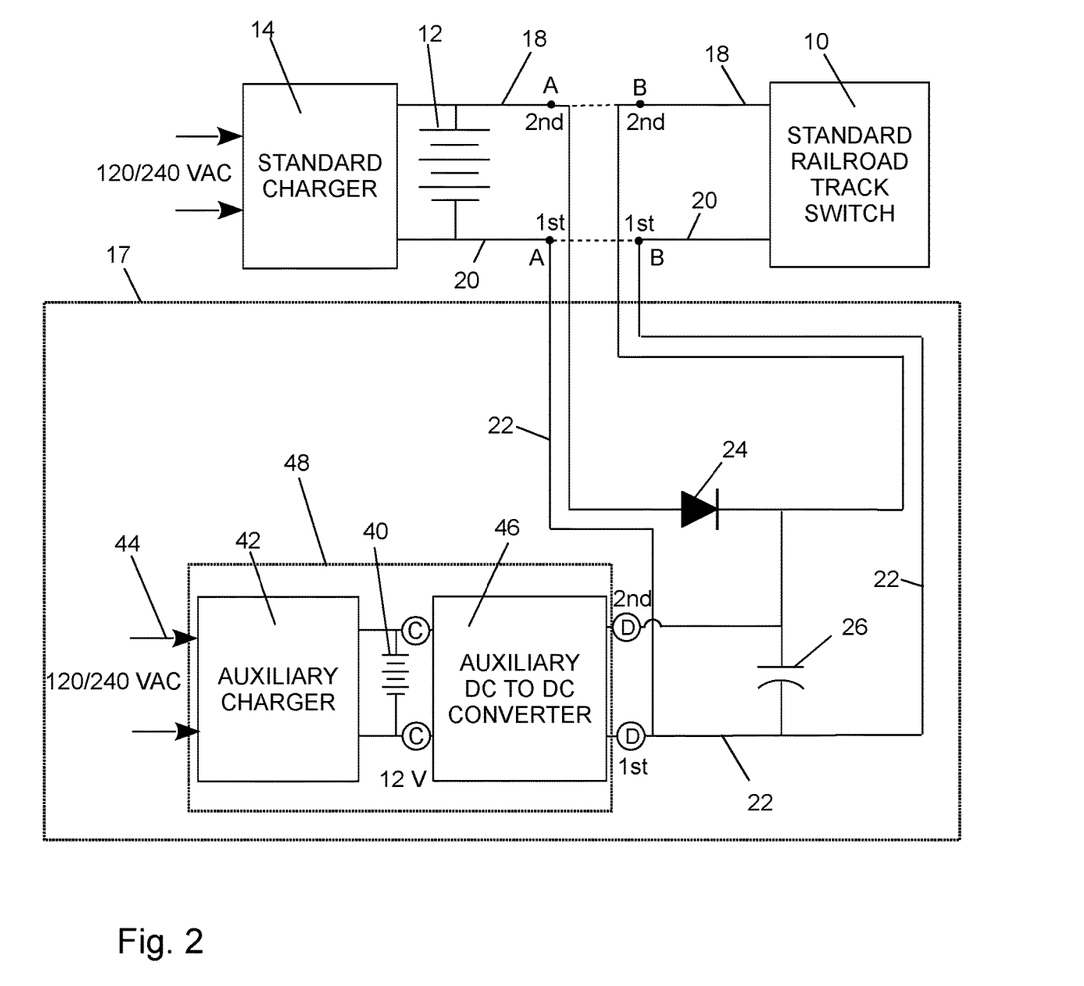
FIG. 2 is a simplified block and schematic diagram showing the fundamental integration of the supplemental power source of the invention into a standard railroad switch system.
Figure 3:
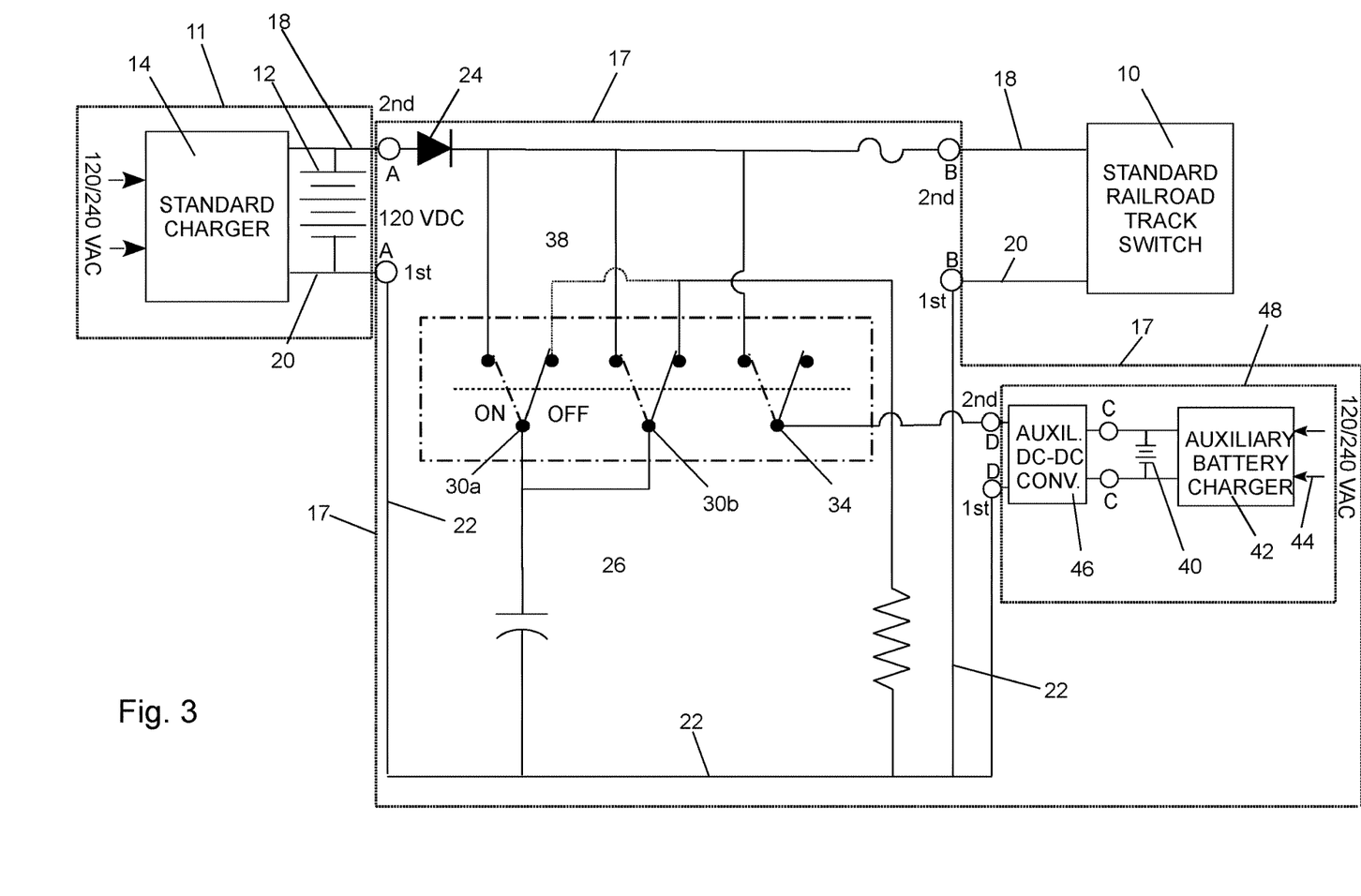
FIG. 3 is a block and schematic diagram that illustrates in more detail the electrical connections and functions of the invention when integrated into a standard railroad switch system.
Figure 4:
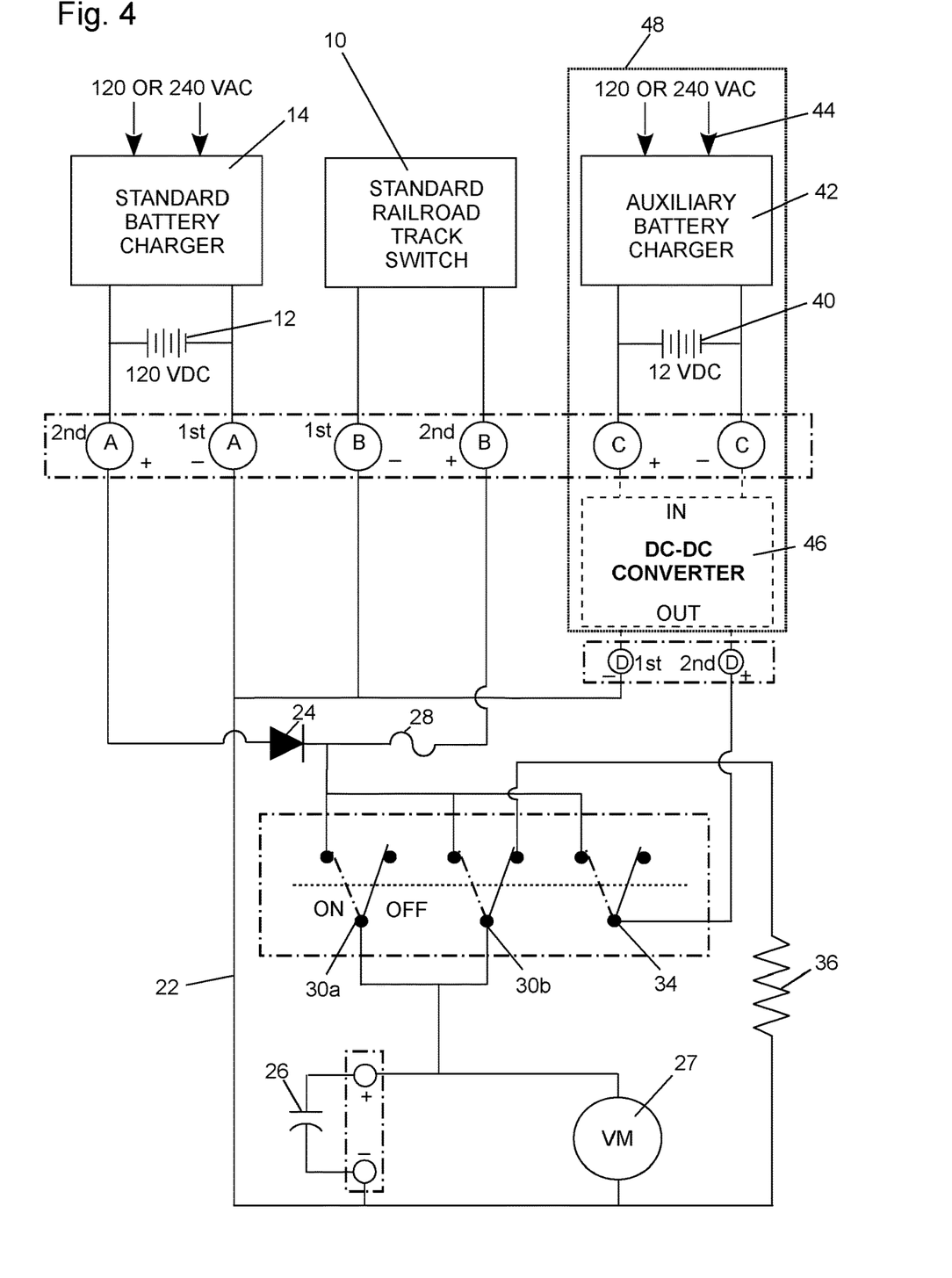
FIG. 4 is a block and schematic diagram that illustrates the electrical connectors of the preferred embodiment of the invention in more detail and integrated into a standard railroad switch system.

FIGS. 2, 3 and 4 illustrate the preferred embodiment of the invention. FIG. 2 is a simplified block diagram showing the fundamental connection of the supplemental power source 17 into a standard railroad switch system. FIG. 3 is a schematic diagram that best illustrates the electric connections and functions of the invention. FIG. 4 is a schematic and block diagram that illustrates the electrical connectors that facilitate the connection of the supplemental power source 17 to the standard railroad switch system in a manner that minimizes the time, labor and cost required to accomplish a retrofit in any of multiple configurations without requiring modification of the supplemental power source 17 to accommodate each different configuration. As used in this description the term "electrical connector", or just "connector", means a device that acts as an electrical interface to a conductor creating a point where external circuits can be connected. A connector allows convenient manual connection of the supplemental power source 17 of the invention to electrical components of a previously installed railroad switch power source 11. Connectors also allow one or more connectors to be left unconnected in alternative installations. The positioning and use of connectors in the circuit at the locations that are illustrated and described avoids the need for custom circuit modification. The prior art shows many types of such electrical connectors that can be used with the invention. These include terminal strips or terminal blocks that are the preferred connectors for embodiments of the invention.

Referring to FIGS. 2 through 4, the supplemental power source 17 of the invention is interposed in the standard railroad switch system that is illustrated in FIG. 1. It is installed by first severing the conductive paths 18 and 20 that connect the standard railroad track switch 10 to the standard railroad track switch power source 11. The segments of the severed conductive paths 18 and 20 that are connected to the standard battery 12 are connected to the supplemental power source 17 input at connectors A. The remaining segments of the severed conductive paths 18 and 20 that are connected to the standard railroad track switch 10 are connected to the supplemental power source output at connectors B.

In describing the connections in the electrical circuits, the connections to circuit components are often referred to as a "first" terminal, conductor or connector and to a "second" terminal, conductor or connector instead of referring to a "positive" terminal, conductor or connector and a "negative" terminal, conductor or connector. The reason is that, as apparent to those skilled in the art, in electrical circuits it is often possible to reverse the connections between the positive and negative sides of a circuit. The simplest example is that a switch connected between a battery and a load can be connected to either the positive side or the negative side and still function in an equivalent manner to turn the load ON and OFF. In order to assist a reader of the description and follow it on the drawings, the drawings are marked with "$1^{st}$" and "$2^{nd}$" labels that correspond to the use of the words "first" and "second". However, it should be understood that the invention is not limited to connection of circuit components to only the positive or negative side. Components that have a characteristic polarity can be reversed in the direction of their polarity when connected to a reversed version of the circuit.

An electrical conductor 22 is electrically connected between a first one of the supplemental power source 17 output connectors (B) and a first one of the supplemental power source 17 input connectors (A), which, in the illustrated embodiment, are on the minus (−) side of the standard railroad switch system. A diode 24 is connected between a second one of the supplemental power source 17 input connectors (A) and a second one of the supplemental power source 17 output connectors (B), which, in the illustrated embodiment, are the positive (+) side of the standard railroad switch system. The diode 24 is connected in a polarity that prevents current flow from the supplemental power source 17 to the standard battery 12 and the standard battery charger 14.

An ultracapacitor 26 is electrically connected between the electrical conductor 22 and the second one of the supplemental power source output connectors (B). An ultracapacitor, also known as a supercapacitor, is a high-capacity capacitor with a capacitance much higher than other capacitors, but with lower voltage limits and typically stores 10 to 100 times more energy per unit volume or mass than electrolytic capacitors. The ultracapacitor 26 in the illustrated preferred embodiment has a capacitance of 6 farads, a nominal voltage rating of 150 VDC and is charged to 120 VDC. In the invention the ultracapacitor 26 is used to store electrical energy for use in actuating the standard railroad track switch 10 in the event of a failure of the standard battery 12 or the standard charger 14. Of course additional ultracapacitors can be parallel connected in order to store more energy. A voltmeter 27 is also connected in parallel with the ultracapacitor 26 for monitoring its voltage and enabling servicing personnel to see whether it is fully charged, partially charged or fully discharged.

As can be seen from the circuit diagrams, the ultracapacitor 26 is charged and maintained in a charged condition by the standard battery 12 and the standard charger 14 so long as neither fails. Importantly, however, the diode 24 prevents current flow in a direction that would charge the standard battery 12 from energy stored in the ultracapacitor 26. This backfeed protection prevents the ultracapacitor 26 from being discharged in the event of a failure of the standard battery 12 or the standard charger 14 which is when the ultracapacitor 26 is needed to power the standard railroad track switch 10.

In order to protect the supplemental power source 17 from damage caused by a short circuit failure of the standard railroad track switch 10, a fuse 28 is interposed in the electrical connection between the diode 24 and the second one of the supplemental power source output connectors (B). The fuse can be a circuit breaker type of fuse that is actuated by an overcurrent.

The supplemental power source 17 also has a switching network that discharges the ultracapacitor 26 and disconnects an auxiliary power source for safety purposes during installation, maintenance or replacement. Preferably there are at least three switches 30a, 30b and 34 although they effectively operate as two switches. The switches 30a, 30b and 34 are preferably manually operable mechanical switches but can alternatively be electromechanical or semiconductor switches. Preferably the switches 30a, 30b and 34 are ganged together for simultaneous actuation to an ON position and an OFF position. The ON position is for normal operation and the OFF position is for installation, repair or replacement.

The first electrical switch 30a has at least two switching positions with its wiper terminal electrically connected to a terminal of the ultracapacitor 26. A secondary switch terminal of switch 30a is electrically connected to the second one of the supplemental power source output connectors (B). In the ON position these connections connect the ultracapacitor 26 to the conductive paths 18 and 20 so that the ultracapacitor 26 is able to provide power for actuating the standard railroad track switch 10.

The second electrical switch 30b also has its wiper terminal electrically connected to the same terminal of the ultracapacitor 26 and a secondary terminal that is also electrically connected to the same second one of the supplemental power source output connectors (B). Persons skilled in the electrical circuitry art will observe that, to the extent described above, switches 30a and 30b are connected in parallel between the ultracapacitor 26 and the second one of the supplemental power source output connectors (B), which is itself connected to the conductive path 18. This identical connection of switches 30a and 30b is provided for purposes of redundancy when the switches are in their ON position.

The other secondary switch terminal of switch 30b is electrically connected through a resistor 36 to the first one of the supplemental power source output connectors (B). More specifically, the resistor is connected to the conductor 22 which, in turn, is connected to the first conductive path 20 at the output connector (B).

Observation of these switch connections reveals that switches 30a and 30b are effectively one switch with redundant conduction paths when they are in their ON position. If, instead of connecting the resistor to switch 30b, the resistor is connected to the corresponding secondary terminal of switch 30a, then the switch 30b can be eliminated. That alternative connection is illustrated by conductor 38. Although that modification would eliminate the redundancy, the electrical connections in the ON and OFF positions that are made by the switch 30a, with the switch 30b eliminated, would be identical to the electrical connections made with the switch 30b included without the modification shown by conductor 38.

Figure 7:
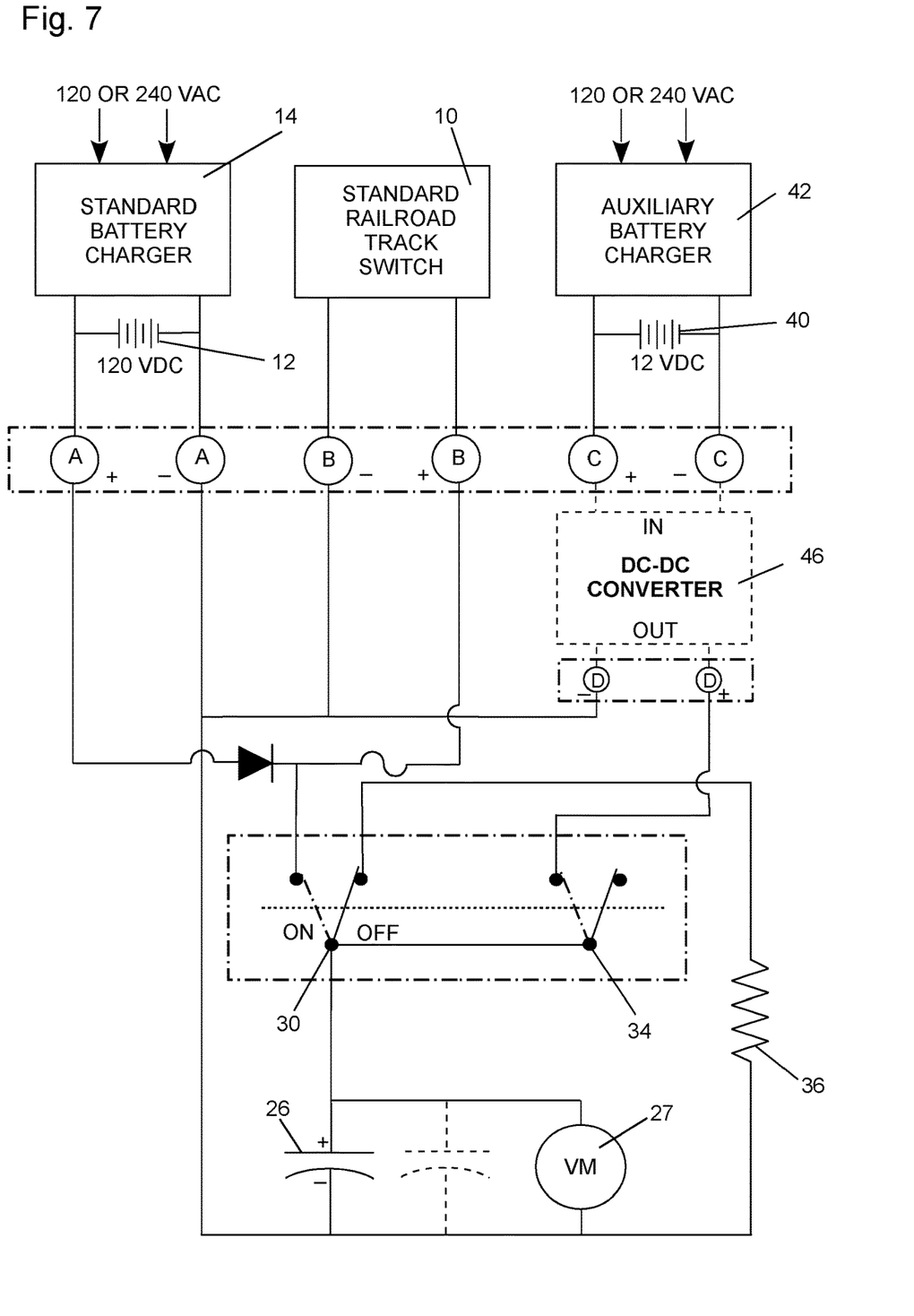
FIG. 7 is a block and schematic diagram similar to FIG. 4 but showing an alternative switch arrangement that is electrically equivalent to the embodiment of FIG. 4.

FIG. 7 illustrates the circuit as described with switch 30b eliminated and the circuit modified as described. The result is that the first electrical switch is the combination of switches 30a and 30b in FIG. 3 and the first electrical switch is switch 30 in FIG. 7. In both cases, the first electrical switch is switchable between an OFF position for discharging the ultracapacitor 26 through the resistor 36 and an ON position for applying the voltage of the ultracapacitor 26 to the second one of the supplemental power source output connectors (B) and through it to the second conductive path 18.

The supplemental power source 17 of the invention also offers an option of including, as an add-on, an auxiliary electrical power source 48. The preferred auxiliary power source includes an auxiliary battery 40 connected to an auxiliary battery charger 42 for charging the auxiliary battery 40 and powering an auxiliary DC-DC converter 46. The power input 44 to the auxiliary battery charger 42 is from the public power grid typically at 120 VAC or 240 VAC. The preferred auxiliary battery 40 is a 12 VDC battery because they are readily available and can be easily and quickly replaced. The auxiliary DC to DC converter 46 has its input connected to the auxiliary battery 40 and its output connected across the ultracapacitor 26. The auxiliary DC to DC converter 46 converts the voltage of auxiliary battery 40 to the ultracapacitor 26 voltage so that the auxiliary battery 40 can charge the ultracapacitor 26.

The optional auxiliary power source 48 can be installed as part of an initial installation of the supplemental power source 17, never installed or installed at a later time. Additionally the auxiliary power source 48 can be installed in either of at least two different optional configurations. In order to accommodate all the possible combinations of options, the supplemental power source 17 includes electrical connectors (C) and (D) to which the components of the auxiliary power source 48 can be connected in a selected configuration if they are installed. If the auxiliary power source 48 is not installed, electrical connectors (C) and (D) can be unconnected.

The pair of converter output connectors (D) allows optional connection of an output from the DC to DC converter 46. A first one of the converter output connectors (D) is connected to the ultracapacitor 26 through the electrical conductor 22. The electrical switch 34 has at least two terminals and is switchable between ON and OFF switching positions. One terminal of the second electrical switch 34 is connected to a second one of the converter output connectors (D). The other terminal of the second electrical switch 34 is connected to the second one of the supplemental power source output connectors (B) through the fuse 28. The purpose of the second electrical switch 34 is to connect the output from the auxiliary DC to DC converter 46 to the ultracapacitor 26 and to the standard railroad track switch 10 when the switches are in their ON position. When the switches are in their OFF position, those connections are disconnected.

As previously stated, one of the options that is available is to install the supplemental power source 17 of the invention with or without the auxiliary power source of electrical power 48. As is the common practice, the electrical circuits are housed in protective cabinets. However, if the supplemental power source 17 is to be installed without the auxiliary power source 48, the supplemental power source 17 can be housed in a smaller cabinet. The arrangement of the connectors allows the later addition of an auxiliary power source 48 that can be housed in an additional cabinet. If an auxiliary power source 48 is later added to a previously installed supplemental power source 17, the auxiliary battery charger 42, the battery 40 and the DC-DC converter 46 can be housed separately in the additional cabinet and their power output connected directly to the connectors (D).

If the supplemental power source 17 is installed with the auxiliary power source 48, the entire supplemental power source 17, including the auxiliary battery charger 42, the battery 40 and the DC-DC converter 46, can be housed in one larger cabinet. In order to accommodate that option, the supplemental power source 17 also has a pair of auxiliary power storage input connectors (C) for connection of the power output of the combination of the auxiliary battery charger 42 and the auxiliary battery 40. The auxiliary DC to DC converter 46 has its input connected the pair of auxiliary power storage circuit input connectors (C) and its output connected to the pair of converter output connectors (D).

In operation, when the switches 30a, 30b and 34 in their ON position the ultracapacitor 26 is charged by the standard battery 12 and the standard charger 14 of the standard track switch power source 11. If the auxiliary source of electrical power 48 is also installed, the charge on the ultracapacitor 26 may also be supplemented by the auxiliary source of electrical power 48. If the standard railroad track switch power source 11 fails and there is no auxiliary power source, the ultracapacitor that was charged before the failure will power the railroad switch as long as sufficient charge remains. The remaining capacitor charge gives a time interval after the failure that allows time for the scheduling and accomplishment of a repair while the switch continues to be operable.

If the standard railroad track switch power source 11 fails but the auxiliary power source 48 of the invention was installed, the ultracapacitor will continue to be charged by the auxiliary power source 48. The standard railroad track switch 10 can continue to operate normally and indefinitely as long as power grid does not suffer an outage. If even the power grid fails, the energy stored in the 12v auxiliary battery 40 and in the ultracapacitor 26 will continue to operate the standard railroad track switch 10 until their energy is depleted. However, in view of the availability of 12 v batteries, the continued operational time can be extended even further by replacing the auxiliary battery 40 with a fully charged battery. Consequently, the invention gives many fall-back position options for extending the operation of a standard railroad track switch well beyond the time of the failure of its standard railroad track switch power source 11.

Figure 5:
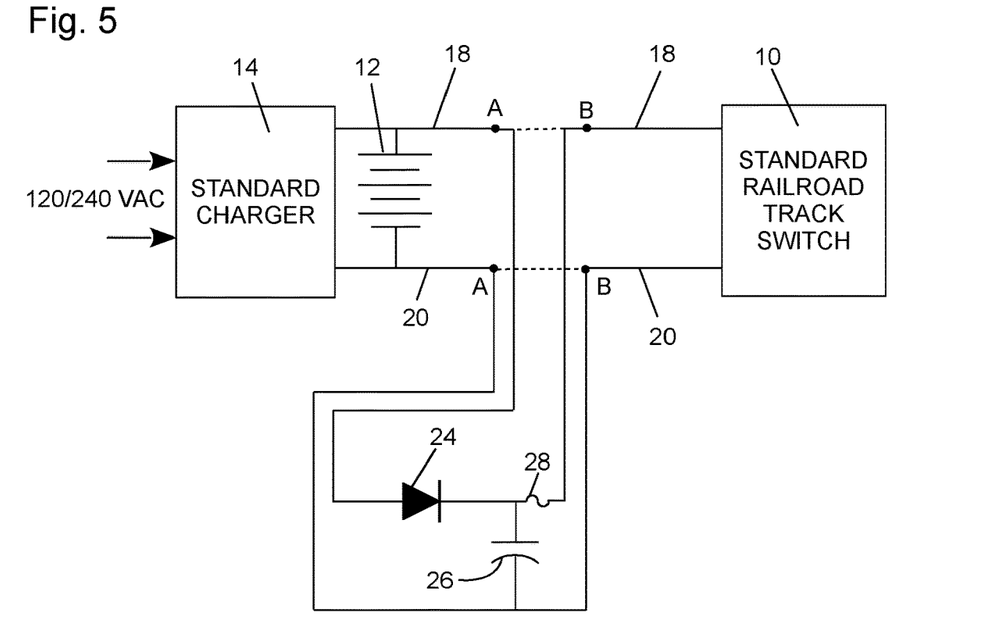
FIG. 5 is a block and schematic diagram of an alternative embodiment of the invention.
Figure 6:
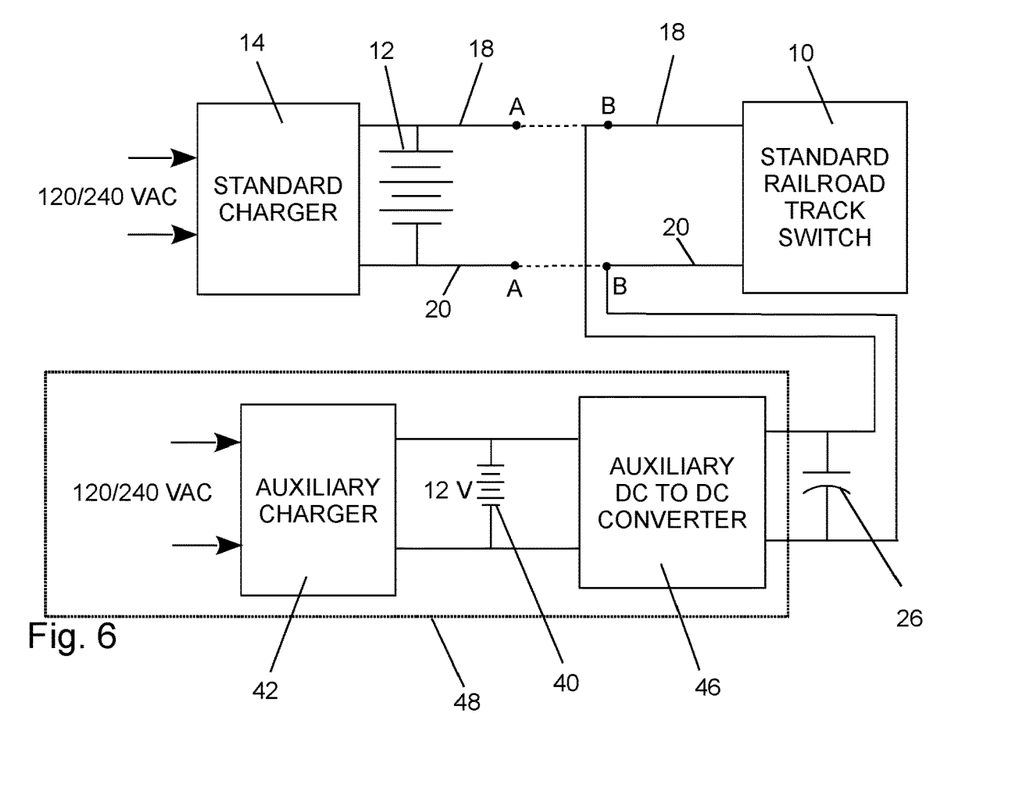
FIG. 6 is a block and schematic diagram of another alternative embodiment of the invention.

FIGS. 5 and 6 illustrate alternative embodiments of the invention. FIG. 5 shows a very simplified version that has the diode 24, the fuse 28 and the ultracapacitor 26. In the circuit of FIG. 6 the standard battery 12 and the standard charger 14 are not connected to the standard railroad track switch 10. Instead the standard railroad track switch 10 is powered entirely by the ultracapacitor 26 which is charged only by the auxiliary source 48 of electrical power.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

TABLE OF REFERENCE CHARACTERS

A supplemental power source input connectors
B supplemental power source output connectors
C auxiliary power storage circuit input connectors
D converter output connectors
10 standard railroad track switch
11 standard railroad track switch power source
12 standard battery
14 standard battery charger
16 input from the public power grid
17 supplemental electric power source circuit
18 first conductive path
20 second conductive path
22 electrical conductor
24 diode
26 ultracapacitor
27 voltmeter
28 fuse or circuit breaker
30a a first switch
30b a redundant switch that electrically is part of the first switch.
34 a second switch
36 resistor
38 conductor to illustrate an alternative connection
40 auxiliary battery
42 auxiliary battery charger
44 input from the public power grid to the auxiliary battery charger
46 auxiliary DC to DC converter
48 auxiliary source of electrical power

The invention claimed is:

1. A supplemental power source that is connectable to a standard railroad track switch power source, the supplemental power source having outputs for connection to inputs of a standard railroad track switch for powering the railroad track switch, the standard railroad track switch power source including a standard battery charger having inputs configured to connect to an AC power grid and having DC outputs, the standard railroad track switch power source also including a standard battery connected to the DC outputs of the standard battery charger; the supplemental power source comprising:
   (a) a pair of supplemental power source input connectors (A) configured for connection to the DC outputs of the standard battery charger and standard battery charger;
   (b) a pair of supplemental power source output connectors (B) configured for connection to a standard railroad track switch;
   (c) an electrical conductor electrically connected between a first one of the supplemental power source output connectors (B) and a first one of the supplemental power source input connectors (A);
   (d) a diode connected between a second one of the supplemental power source input connectors (A) and a second one of the supplemental power source output connectors (B), the diode connected in a polarity to prevent current flow to the standard battery and the standard battery charger; and
   (e) an ultracapacitor electrically connected between said electrical conductor and the second one of the supplemental power source output connectors (B).

2. The supplemental power source according to claim 1 wherein a fuse is interposed in the electrical connection between the diode and the second one of the supplemental power source output connectors (B).

3. The supplemental power source according to claim 2 and further comprising:
   (a) a first electrical switch having at least two switching positions, the first electrical switch having (i) a wiper terminal electrically connected to a terminal of the ultracapacitor;

(ii) a secondary switch terminal that is electrically connected to the second one of the supplemental power source output connectors (B) and (iii) a secondary switch terminal that is electrically connected through a resistor to the first one of the supplemental power source output connectors (B);

the first electrical switch being switchable between an OFF position for discharging the ultracapacitor through the resistor and an ON position for applying the voltage of the ultracapacitor to the second one of the supplemental power source output connectors (B).

4. The supplemental power source according to claim 3 and further comprising:

(a) a pair of converter output connectors (D) for optional connection of an output from a DC to DC converter; a first one of the converter output connectors connected to said ultracapacitor;

(b) a second electrical switch having at least two terminals and switchable between ON and OFF switching positions, one terminal of the second electrical switch connected to a second one of the converter output connectors (D) and the other terminal of the second electrical switch connected to the second one of the supplemental power source output connectors (B).

5. The supplemental power source according to claim 4 and further comprising:

(a) a pair of auxiliary power storage circuit input connectors (C) for connection of an auxiliary source of electrical power for charging the ultracapacitor.

6. The supplemental power source according to claim 5 and further comprising:

(a) an auxiliary battery connected to the pair of auxiliary power storage input connectors (C); and (b) an auxiliary battery charger having its output connected to the auxiliary battery; and (c) a DC to DC converter having an input connected the pair of auxiliary power storage circuit input connectors (C) and an output connected to the pair of converter output connectors (D).

7. A railroad track switch power source having railroad track switch outputs configured for connection to inputs of a railroad track switch, the railroad track switch power source comprising:

(a) a standard battery charger having inputs configured to connect to an AC power grid and having DC outputs;

(b) a standard battery connected to the DC outputs of the standard battery charger;

(c) an electrical conductor electrically connected between a first one of the railroad track switch outputs and a first one of the DC outputs of the standard battery charger;

(d) a diode connected between a second one of the DC outputs of the battery charger and a second one of the railroad track switch outputs, the diode connected in a polarity to prevent current flow to the standard battery and the standard battery charger; and (d) an ultracapacitor electrically connected between said electrical conductor and the second one of the railroad track switch outputs.

8. The railroad switch power source according to claim 7 wherein a fuse is interposed in the electrical connection between the diode and the second one of the railroad track switch outputs.

9. The supplemental power source according to claim 7 and further comprising:

(a) a first electrical switch having at least two switching positions, the first electrical switch having (i) a wiper terminal electrically connected to a terminal of the ultracapacitor;

(ii) a secondary switch terminal that is electrically connected to the second one of the railroad track switch outputs; and (iii) a secondary switch terminal that is electrically connected through a resistor to the first one of the railroad track switch outputs;

the first electrical switch being switchable between an OFF position for discharging the ultracapacitor through the resistor and an ON position for applying the voltage of the ultracapacitor to the second one of the railroad track switch outputs.

10. The supplemental power source according to claim 9 and further comprising:

(a) an auxiliary battery charger having inputs configured to connect to an AC power grid and having DC outputs;

(b) an auxiliary battery having terminals connected to the outputs of the auxiliary battery charger;

(c) an auxiliary DC to DC converter having an input connected the auxiliary battery terminals and having an output; and (d) a second electrical switch having at least two terminals and switchable between ON and OFF switching positions, one terminal of the second electrical switch connected to a second one of the auxiliary converter outputs connectors and its other terminal of the second electrical switch connected to the second one of the railroad track switch outputs.

* * * * *